United States Patent [19]
Michioka

[11] Patent Number: 5,601,511
[45] Date of Patent: Feb. 11, 1997

[54] TEMPERATURE CONTROL SYSTEM FOR A VEHICLE POWER TRAIN

[75] Inventor: Hirofumi Michioka, Fujisawa, Japan

[73] Assignee: Nissan Motor Co., Ltd., Yokohama, Japan

[21] Appl. No.: 452,119

[22] Filed: May 26, 1995

[30] Foreign Application Priority Data

May 27, 1994 [JP] Japan .................... 6-115192

[51] Int. Cl.⁶ .................................... F16H 59/72
[52] U.S. Cl. .................... 477/98; 477/105; 477/110
[58] Field of Search .................. 475/117, 161; 477/98, 105, 110, 141, 133, 136, 85, 91, 76, 107, 111

[56] References Cited

U.S. PATENT DOCUMENTS

| | | |
|---|---|---|
| 4,389,910 | 6/1983 | Lockhart .................... 477/111 |
| 4,733,581 | 3/1988 | Hasegawa et al. .................... 477/98 |
| 4,968,999 | 11/1990 | Fodale et al. .................... 477/107 |
| 5,072,630 | 12/1991 | Kiluchi et al. .................... 477/98 |
| 5,383,824 | 1/1995 | Runge et al. .................... 477/110 |
| 5,433,676 | 7/1995 | Abe et al. .................... 477/109 |

Primary Examiner—Vinh T. Luong
Assistant Examiner—Sherry Lynn Estremsky
Attorney, Agent, or Firm—Foley & Lardner

[57] ABSTRACT

A control system for a power train of an automotive vehicle prevents thermally overloaded state of a hydraulically controlled automatic transmission when a severe thermal load condition of an engine is maintained for a predetermined time. An engine controller is supplied with signals representing a throttle opening, an engine speed and a vehicle speed, and performs an engine torque reduction control when the transmission has been judged to be under a thermally overloaded condition, so as to prompt a driver to effect a downshifting and thereby eliminate an overloaded state of the transmission.

5 Claims, 5 Drawing Sheets

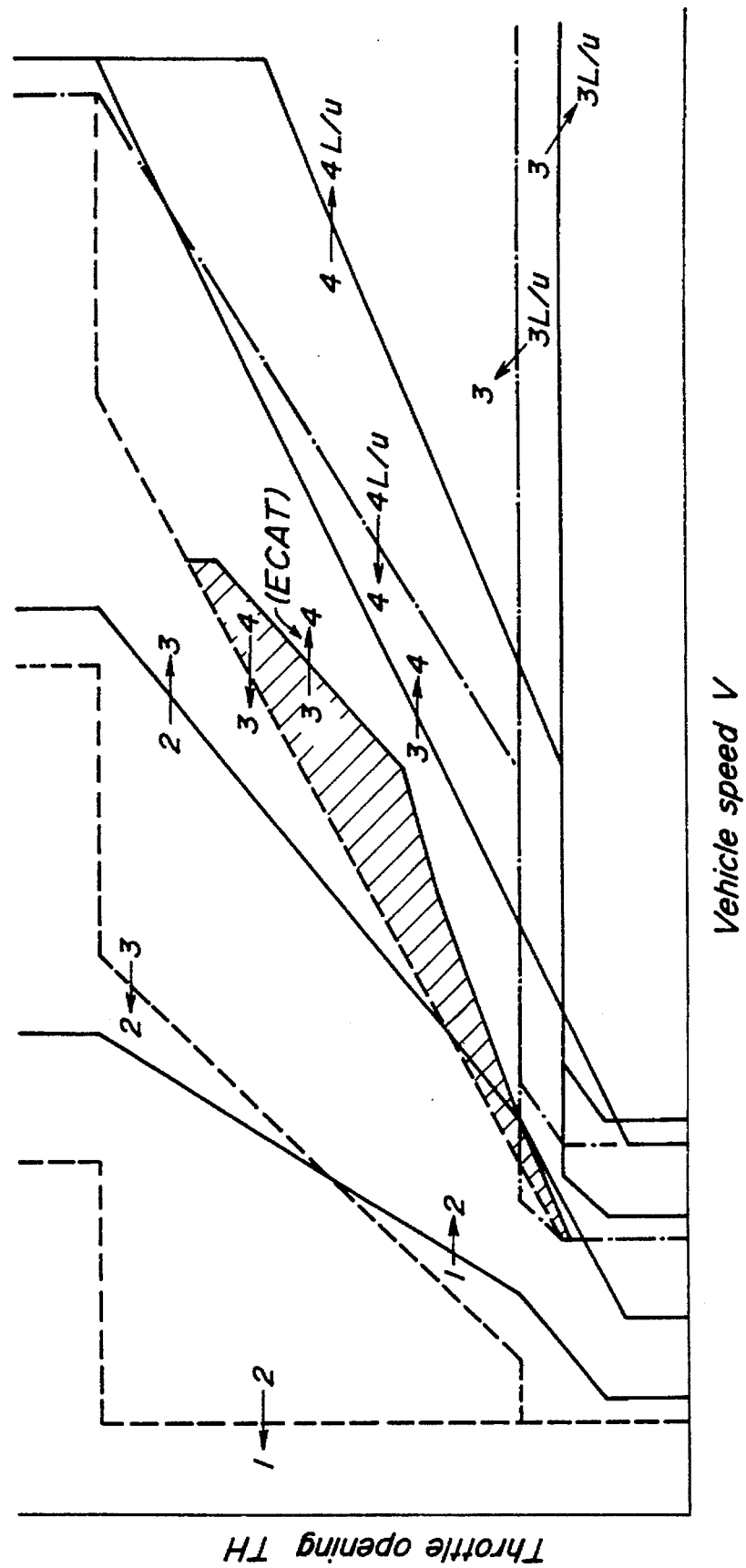

TEMPERATURE CONTROL SYSTEM FOR A VEHICLE POWER TRAIN

BACKGROUND OF THE INVENTION

1. Field of the Invention

The present invention relates generally to a control system for a vehicle power train; in particular, it pertains to a temperature control system whereby the transmission fluid in a hydraulically controlled automatic transmission can be prevented from being overheated in a severe thermal load condition of the engine and/or transmission.

2. Description of the Relate Art

A hydraulically controlled automatic transmission is known for years and disclosed, for instance, in "SERVICE MANUAL FOR RN3F01A-TYPE AUTOMATIC TRANSAXLE" issued by Nissan Motor Co., Ltd., the assignee of this invention. In this type of automatic transmission, an upshifting or downshifting gear change can be automatically achieved by selecting a speed range in accordance with a throttle pressure and a governor pressure both derived from a line pressure, which are supplied to shift valves in a hydraulic control circuit. The gear change can also be achieved manually, by a driver's operation of a control lever for selecting a speed range of the transmission.

In the case of electronically controlled automatic transmission, an upshifting or downshifting gear change from one speed range to another speed range is achieved by selectively fastening various friction elements such as clutches, brakes and so on, in accordance with electronic commands. The shift control uses a gear shift map which is based on various parameters, such as vehicle speed and throttle opening, and an upshifting or downshifting gear change is performed when the driving condition of the vehicle changes and the relevant parameter crosses a shift line in the shift map.

The hydraulically controlled automatic transmission can be constructed only from a hydraulic system, by replacing the electronic commands of the electronically controlled automatic transmission with hydraulic commands and performing a similar shift control using the throttle pressure and governor pressure. Thus, the hydraulically controlled automatic transmission can be manufactured at a relatively low cost in comparison to the electronically controlled transmission, and serves to achieve a significant cost reduction.

However, because the hydraulically controlled automatic transmission is not provided with an electronic control system, it may be difficult to adopt effective countermeasures to overheating of the mission fluid. Thus, for example, the hydraulically controlled type automatic transmission cannot perform a control operation for avoiding an overheated condition of the transmission fluid which may be caused by a continued driving of the vehicle under a severe thermal load condition of the engine and/or transmission.

SUMMARY OF THE INVENTION

It is therefore an object of the present invention to prevent the transmission fluid in a hydraulically con,trolled automatic transmission from being overheated in a severe thermal load condition of the engine and/or transmission.

The present invention is based on a recognition that the transmission fluid can be effectively prevented from being overheated, by limiting the engine torque and prompting a downshift so as to prevent a thermally overloaded state of the transmission fluid from being maintained for a period longer than a predetermined time.

Briefly stated, the present invention provides a control system for a power train of an automotive vehicle which includes an engine and a hydraulically controlled automatic transmission. The control system comprises a first detector means for detecting a throttle opening of the engine, a second detector means for detecting an engine speed, and a third detector means for detecting a vehicle speed. The control system further comprises a judgment means connected to the first, second and third detector means, for judging on the basis of the detected throttle opening, engine speed and vehicle speed whether or not the transmission is under a thermally overloaded condition, and a torque limiter means connected to the judgment means, for limiting an engine torque when the transmission has been judged to be under the overloaded condition.

With the above-mentioned control system in accordance with the present invention, based on the throttle opening detected by the first detector means, the engine speed detected second detector means and the vehicle speed detected by the third detector means, the judgment means judges whether or not the hydraulically controlled automatic transmission is under a thermally overloaded condition. When it has been judged that the automatic transmission is under a thermally overloaded condition, the torque limiter means limits the engine torque. Such a torque reduction control results in that, drawn from a region corresponding to the thermally overloaded state of the transmission, the driving state of the vehicle comes to cross a downshift line due to an increased throttle opening caused by the driver's depression of the accelerator pedal, or due to a decreased vehicle speed. Hence a thermally overloaded state of the transmission is not maintained for a long period, and it is thus possible to avoid an overheated condition of the transmission fluid.

Advantageously, the torque limiter means is adapted to limit the engine torque within a range in which a downshifting does not occur. This is preferable for quickly eliminating a thermally overloaded state of the hydraulically controlled automatic transmission, by depressing the accelerator pedal in a critical state immediately before a downshifting, or by reducing the vehicle speed to facilitate the downshifting.

Advantageously, the engine torque limiter means is adapted to limit the engine torque when the thermal overload condition of the transmission is maintained for a duration which is longer than a predetermined time. This eliminates a temporary thermal overload from the control object, thereby effectively avoiding a hunting in the control.

Preferably, the engine torque limiter means is adapted to limit the engine torque for a predetermined duration.

Preferably, the engine torque limiter means is adapted to limit the engine torque by controlling the number of engine cylinders subjected to a fuel supply cut.

BRIEF DESCRIPTION OF THE DRAWINGS

The present invention will be further explained below with reference to a preferred embodiment shown in the accompanying drawings, in which:

FIG. 5 is a shift diagram of a hydraulically controlled automatic transmission to which the present invention may be applied.

DETAILED DESCRIPTION OF THE PREFERRED EMBODIMENT

Figure 1:
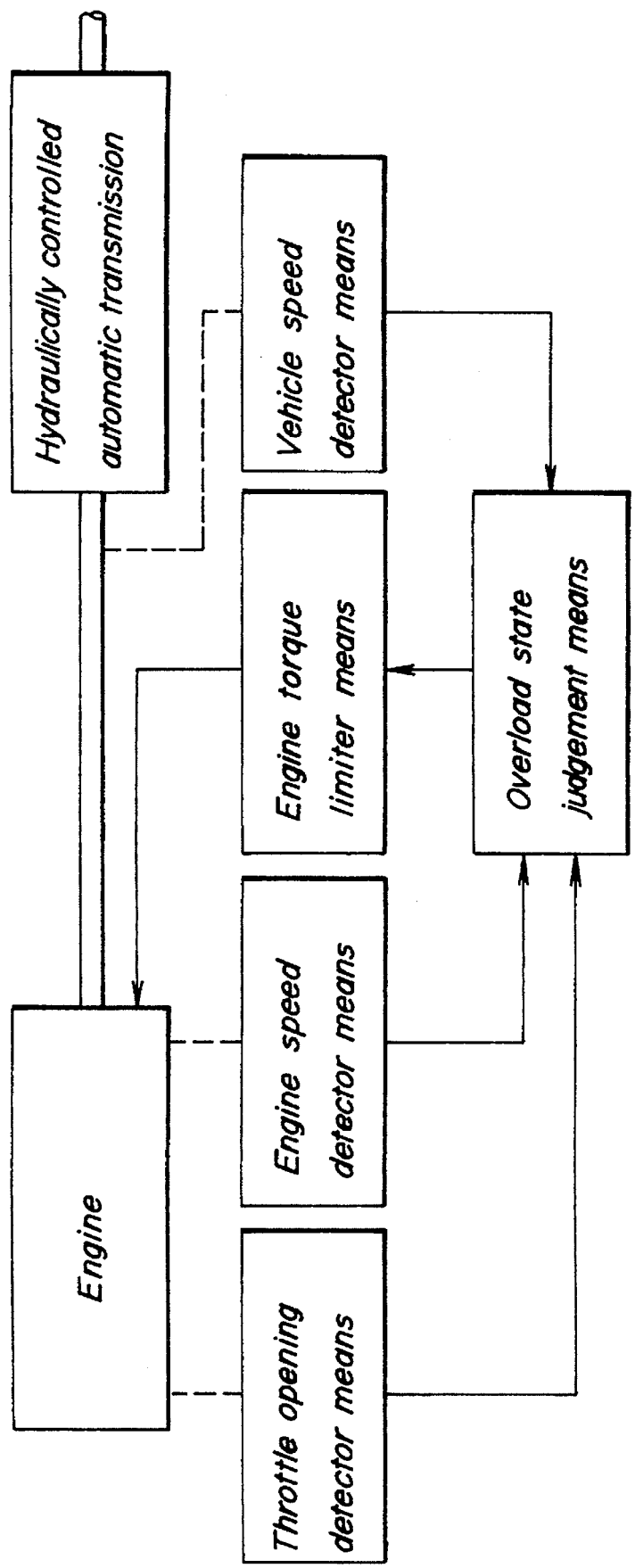
FIG. 1 is a schematic diagram showing the basic concept of the control system according to the present invention.

Referring now to FIG. 1, the present invention provides a control system for a power train of an automotive vehicle which comprises an engine and a hydraulically controlled automatic transmission. The system comprises a throttle opening detector means, an engine speed detector means and a vehicle speed detector means. A judgment means is connected to these detector means, for judging on the basis of the detected throttle opening, engine speed and vehicle speed whether or not the transmission is under a thermal overload condition. When the transmission has been judged to be under the overload condition, a torque limiter means serves to limit the engine torque.

Figure 2:
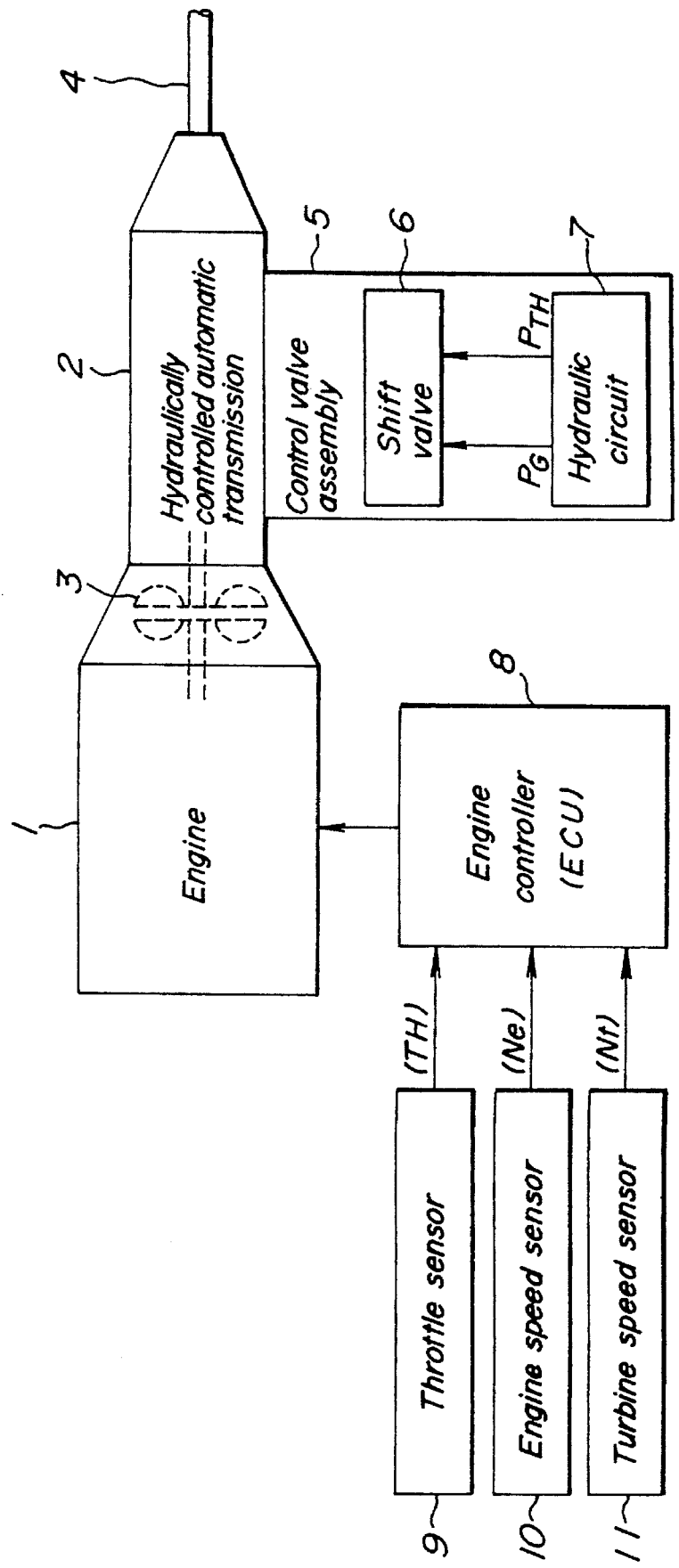
FIG. 2 is a diagram showing the control system according to one embodiment of the present invention.

FIG. 2 shows the arrangement of the control system according to one embodiment of the present invention, which makes it possible to prevent a thermal overload of the automatic transmission 2 when a severe thermal load condition of the engine 1 is maintained for a predetermined time. The driving force or torque of the engine 1 is transmitted to the automatic transmission 2 through a torque converter 3. In the illustrated embodiment, the automatic transmission 2 is a four-speed transmission in which an input rotation is changed to an output rotation in accordance with a gear ratio corresponding to a selected speed range, and transmitted to an output shaft 4.

In the case of a hydraulically controlled type automatic transmission, a valve body 5 is secured to the transmission casing and provided with shift valves 6 and a signal generating circuit 7 therein. The signal generating circuit 7 is supplied with a line pressure and generates a throttle pressure $P_{TH}$ and a governor pressure $P_G$, which are supplied to the shift valves 6. An upshifting or downshifting gear change can be automatically effected by selecting a corresponding speed range according to the throttle pressure $P_{TH}$ and the governor pressure $P_G$. Further, the gear change can also be achieved by a driver's manual operation of a control lever (not shown).

The control valve body 5 is further provided with a lock-up valve (not shown). By a hydraulic control of the lock-up valve, the torque converter 3 selectively assumes a converter state in which input and output elements of the torque converter are connected to each other through the transmission fluid, and a lock-up state in which the input and output elements are directly connected to each other.

The engine 1 is associated with an electronic controller 8 which may be referred to as "ECU". The ECU 8 serves to control various parameters of the engine 1, which in this case include the output torque. The ECU 8 is supplied with a signal from a throttle sensor 9 for detecting a throttle opening TH, a signal from an engine speed sensor 10 for detecting the engine speed Ne, and a signal from a turbine speed sensor 11 for detecting the vehicle speed V based on the rotational speed of a turbine of the torque converter 3. In the illustrated embodiment, a turbine speed sensor is used as the vehicle speed sensor. Alternatively, however, a rotational speed sensor for the transmission output member may be used as the vehicle speed sensor.

Figure 3:
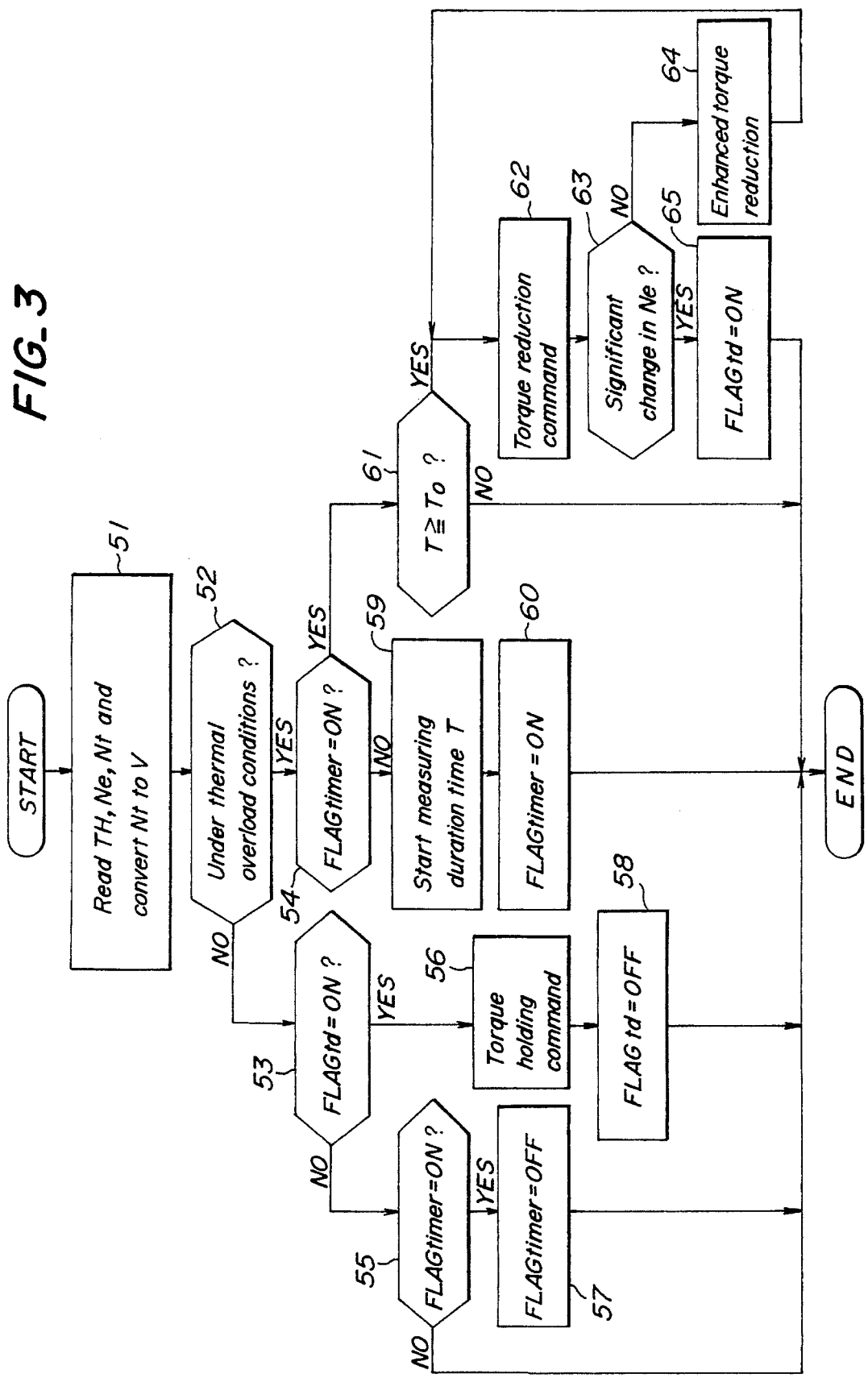
FIG 3 is a flowchart illustrating a control program for an engine torque reduction control, which is executed by an engine controller in the embodiment of FIG. 2.

Furthermore, the ECU 8 performs an engine torque reduction control by executing a control program shown in FIG. 3 on the basis of each input signal, to thereby prevent the transmission fluid temperature from being elevated to an excessively high temperature. In this connection, it is assumed that the automatic transmission 2 performs a normal shift control and lock-up control by executing a control program (not shown) independent of the torque reduction control of the engine.

Figure 4:
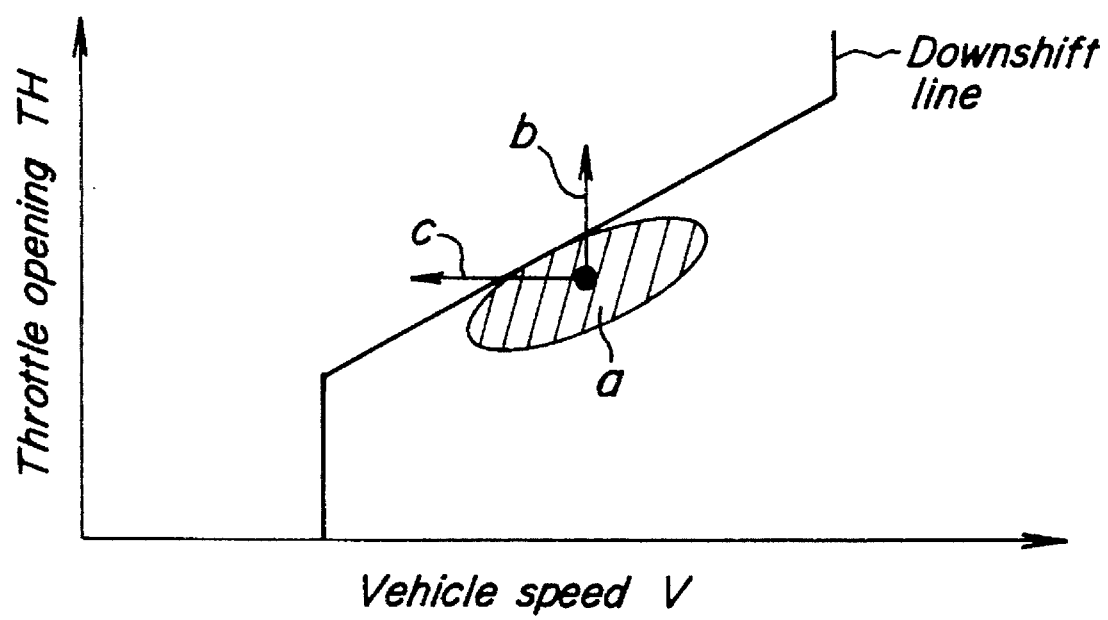
FIG 4 is a schematic diagram explaining the operation of the control system according to the present invention.

FIG. 3 illustrates a flowchart of a control program for a engine torque reduction control to be repeatedly executed by the ECU 8 every period or cycle by performing a fixed time interruption. First of all, in a step 51, a throttle opening TH, an engine speed Ne and a turbine speed Nt are read from the sensors 9 to 11, respectively. The turbine speed Nt is converted into a vehicle speed V by performing a predetermined operation, for instance, by multiplying a constant according to a current gear ratio of the automatic transmission 2. In the next step 52, it is judged on the basis of the throttle opening TH, engine speed Ne and turbine speed Nt whether or not the automatic transmission 2 is in a thermally overloaded state. Referring to FIG. 4, for example, if the thermal load does not fall within a region "a" corresponding to the thermally overloaded state of the automatic transmission 2, the control program advances to a step 53. If the thermal load falls within the region "a", the control program advances to another step 54.

In the step 53, it is judged whether a torque reduction flag FLAGtd is ON or OFF. If the torque reduction flag FLAGtd is OFF, the torque reduction control is not being performed, and the control program advances to a step 55. If the torque reduction flag FLAGtd is ON, the torque reduction control is being performed, and the control program advances to another step 56. In the step 55, it is judged whether a timer flag FLAGtimer is ON or OFF. If the timer flag FLAGtimer is ON, the current control is finished after the timer flag has been reset in step 57 (FLAGtimer=OFF). If the timer flag FLAGtimer is OFF, the current control is finished without performing anything else. Further, in the step 56, a holding command is executed so that the torque of the engine which is being subjected to a torque reduction control is held for a predetermined time. After a lapse of the predetermined time, the torque reduction flag FLAGtd is reset (FLAGtd=OFF) in a next step 58 and the current control is finished.

In the step 54 to which the control program advances if it has been judged in the step 52 that the thermal load of the automatic transmission 2 falls within the region "a" corresponding to the thermally overloaded state of the transmission, it is judged whether or not the timer flag is ON (FLAGtimer=ON). Immediately after the automatic transmission has been put into a thermally overloaded state, the time flag is reset in the step 57 in the preceding control period or cycle and thus a result of this judgment is NO. Consequently, the control program comes to advance to a next step 59. In this step 59, a measurement of duration time of the overloaded state is started. Subsequently, the timer flag FLAGtimer is made ON (FLAGtimer=ON) in the next step 60 and the current control is finished.

When the overloaded state continues, a result of the judgment made in the step 54 of the next control cycle becomes YES. Thus the control program advances to a next step 61. In this step 61, it is judged whether or not the duration time T reaches a predetermined time T0. The torque reduction control according to the present invention is not performed and the control is finished until the duration time T reaches the predetermined time T0. If the duration time T reaches the predetermined time T0, the control program advances to a next step 62.

In the step 62, the ECU 8 sends a predetermined torque reduction command to the engine 1 so as to decrease the output torque of the engine 1 by a predetermined amount. Then, in the next step 63, it is judged whether or not the change in the engine speed Ne is significant as would occur due to a downshift from a current gear range to the next lower gear range. When it has been judged in the step 63 that the change in the engine speed Ne is insignificant, a loop including a NO-branch from the step 63 and the steps 64, 62 and 63 is repeatedly performed and the engine torque reduction amount is increased in the step 64. When the change in the engine speed Ne becomes significant, the control program advances to another step 65 and the torque reduction flag is made to be ON (FLAGtd=ON).

Incidentally, the step 51 corresponds to the throttle opening sensor 9, the engine speed sensor 10 and the vehicle speed sensor 11; the step 52 to the overload state judgment means; and the steps 54 to 64 the engine torque limiter means.

Next, the operation of the illustrated embodiment will be described with reference to FIG. 5.

First of all, in a normal situation wherein the thermal load of the automatic transmission 2 does not fall within the region "a" (FIG. 4) corresponding to the thermally overloaded state of the transmission, the control program follows a path from the step 51 through the NO-branches of the steps 52, 53 and 54, and the engine torque reduction control according to the present invention is not performed.

Subsequently, when thermal load of the automatic transmission 2 comes to fall within the region "a" corresponding to the thermally overloaded state of the transmission, the control program follows a path from the step 51 through the YES-branch of the step 52, the NO-branch of the step 54, and the steps 59 and 60. Thereafter, the measurement of the duration time T is commenced. Then, the timer flag FLAG-timer is made to be ON.

In the next control period or cycle, the control program follows a path from the step 51 through the YES-branch of the step 52 and the step 61, so that the engine torque reduction control according to the present invention is not performed until the result of the judgment made in the step 61 becomes YES, i.e., until the duration time T of the aforementioned thermally overloaded state reaches the predetermined time T0.

If the duration time T of the thermally overloaded state reaches the predetermined time T0, the result of the judgment made in the step 61 becomes YES. Thus the engine torque reduction control according to the present invention is performed in the step 62. The engine torque reduction control is repeatedly performed until it is judged in the step 63 that the change in the engine speed Ne becomes significant as would occur by a downshifting to the next lower gear. During that time, the engine torque reduction control amount is continuously increased by performing the execution of the step 64.

When the current operating state of the automatic transmission enters a hatched region below a 4th-to-3rd shift line of FIG. 5, which corresponds to a region enclosed by a 4th-to-3rd downshift line and a 3rd-to-4th upshift line in the case of an electronically controlled automatic transmission (ECAT), the thermal load of the automatic transmission 2 would be excessive thereby giving rise to an elevated transmission fluid temperature if such an overloaded situation were ignored. However, due to the engine torque reduction control performed by the execution of the step 64, the operating state of the transmission approaches the border of the 4th-to-3rd downshift line. Consequently, when the driver feels engine torque shortage and depresses an accelerator pedal to increase the throttle valve opening TH as shown by arrow "b" in FIG. 4, or when the 4th-to-3rd gear change line is crossed as the engine speed Ne decreases as shown by arrow "c" in FIG. 4, a 4th-to-3rd downshift gear change is carried out and the vehicle is driven in a state in which the thermal load is mitigated. Thereby, the thermally overload state of the automatic transmission 2 comes to be gradually eliminated. Furthermore, the aforementioned effects can be realized at an extremely low cost only by changing a control logic of the existing system, without requiring addition of an oil temperature sensor or a vehicle speed sensor to the system.

Meanwhile, there is a time lag between the torque reduction control and the actual reduction in temperature of the transmission fluid. Thus, immediately after the result of the judgment made in the step 52 becomes NO, the control program advances from a YES-branch of the step 53 to the step 56 so as to execute a holding command for holding the output torque of the engine under the torque reduction control for the predetermined time, and thereby ensure the transmission fluid temperature to be lowered.

Furthermore, when the transmission fluid temperature has been sufficiently lowered, the timer flag is reset by executing the control program by following a path from the NO-branch of the step 53 to the step 57 through the YES-step of the step 55. Consequently, the system can deal cope with a case where an operating state requiring the aforementioned torque reduction control occurs next time.

The engine torque reduction control can be performed in various manner, such as an ignition retarding control, a fuel cut control, a control of the number cylinders for which the fuel supply is to be cut. In the case of the illustrated embodiment, the control of the number cylinders for which the fuel supply is to be cut may be most advantageous for avoiding adverse influence to a catalyst, in view of the fact that the engine torque reduction control is performed for a relatively long time.

It will be appreciated from the foregoing description that the present invention effectively prevents the transmission fluid from being overheated, by limiting the engine torque in a severe thermal load condition of the engine and/or hydraulically controlled automatic transmission.

While the present invention has been described with reference to a specific embodiment, it is of course that various changes or modifications may be made without departing from the scope of the invention.

What is claimed is:

1. A control system for a power train of an automotive vehicle which includes an engine and a hydraulically controlled automatic transmission, comprising:

a first detector means for detecting a throttle opening of the engine;

a second detector means for detecting an engine speed;

a third detector means for detecting a vehicle speed;

a judgment means connected to said first, second and third detector means, for judging on the basis of the detected throttle opening, engine speed and vehicle speed whether or not the transmission is under a thermally overloaded condition, and a torque limiter means connected to said judgment means, for limiting an engine torque when the transmission has been judged to be under the overloaded condition.

2. The control system according to claim 1, wherein the torque limiter means is adapted to limit the engine torque within a range until a downshifting occurs.

3. The control system according to claim 1, wherein the engine torque limiter means is adapted to limit the engine torque when the thermal overload condition of the transmission is maintained for a duration which is longer than a predetermined time.

4. The control system according to claim 1, wherein the engine torque limiter means is adapted to limit the engine torque for a predetermined duration.

5. The control system according to claim 1, wherein the engine torque limiter means is adapted to limit the engine torque by controlling the number of engine cylinders subjected to a fuel supply cut.

* * * * *